United States Patent
Ito et al.

(10) Patent No.: US 8,993,990 B2
(45) Date of Patent: Mar. 31, 2015

(54) DETECTION DEVICE AND IMAGE FORMING APPARATUS FOR REDUCING A CAVITY EFFECT

(75) Inventors: Masao Ito, Kanagawa (JP); Izumi Iwasa, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 980 days.

(21) Appl. No.: 13/093,416

(22) Filed: Apr. 25, 2011

(65) Prior Publication Data

US 2012/0099110 A1 Apr. 26, 2012

(30) Foreign Application Priority Data

Oct. 22, 2010 (JP) ................................. 2010-238010

(51) Int. Cl.
*G01N 21/86* (2006.01)
*H01J 3/14* (2006.01)
*G03G 15/04* (2006.01)

(52) U.S. Cl.
CPC .......... *G02B 1/116* (2013.01); *G03G 15/04036* (2013.01)
USPC ..................................... 250/559.01; 250/216

(58) Field of Classification Search
CPC ... G01N 21/86; G01N 21/88; G01N 21/8851; G01N 21/89; G01N 21/90; G01N 21/91; G01N 21/94; G01N 21/8901; G01N 21/8903; G01N 21/8914; G01N 21/8915; G01N 21/8916; G01N 21/892; G01N 21/8921; G01N 21/8922; G01N 21/00; G01N 21/47
USPC ............ 250/208.1, 239, 216, 559.01–559.08, 250/559.16–559.18, 559.4–559.49; 356/429–435, 445–448, 237.1–239.8, 356/600–608; 382/101, 102, 112, 113, 135, 382/141, 181, 190; 257/431–437; 438/69, 438/72

See application file for complete search history.

(56) References Cited

U.S. PATENT DOCUMENTS 5,712,705 A * 1/1998 Fattinger et al. ............... 356/521
5,751,447 A * 5/1998 Brook et al. ................... 358/487

(Continued)

FOREIGN PATENT DOCUMENTS

| JP | 0251105 A | 2/1990 |
|---|---|---|
| JP | 03-200052 A | 9/1991 |
| JP | 05325900 A | 12/1993 |

(Continued)

OTHER PUBLICATIONS

Japanese Office Action (Notice of Reasons for Rejection) mailed May 13, 2014 in Japanese application 2010-238010.

(Continued)

*Primary Examiner* — Pascal M Bui Pho
(74) *Attorney, Agent, or Firm* — Sughrue Mion, PLLC

(57) ABSTRACT

A detection device includes: a detection member that includes an emission member emitting a beam toward a direction of a transportation path and a beam receiving member receiving a reflected beam reflected from a medium; a transmissive member that is provided to allow a regular reflected beam of the beam reflected from the medium to be obliquely incident thereto, and through which the beam emitted from the emission member is transmitted; and a multiple-layered antireflective film that is provided on the transmissive member, the antireflective film being formed such that a maximum value of reflectivity of a first incident beam incident at the same angle as an incident angle of the regular reflected beam becomes smaller than a maximum value of reflectivity of a second incident beam incident in the direction perpendicular to the transmissive member within a visible light wavelength range.

5 Claims, 10 Drawing Sheets

(56) References Cited

U.S. PATENT DOCUMENTS

| | | | |
|---|---|---|---|
| 2009/0122359 A1* | 5/2009 | Kondo et al. | 358/474 |
| 2010/0178621 A1 | 7/2010 | Hakko et al. | |
| 2011/0149399 A1* | 6/2011 | Peng et al. | 359/580 |

FOREIGN PATENT DOCUMENTS

| | | |
|---|---|---|
| JP | 05333450 A | 12/1993 |
| JP | 2009-157504 A | 7/2009 |
| JP | 2010-114498 A | 5/2010 |
| JP | 2010165856 A | 7/2010 |

OTHER PUBLICATIONS

Communication dated Jan. 6, 2015, issued by the Japanese Patent Office in counterpart Japanese application No. 2010-238010.

* cited by examiner

US 8,993,990 B2

DETECTION DEVICE AND IMAGE FORMING APPARATUS FOR REDUCING A CAVITY EFFECT

CROSS-REFERENCE TO RELATED APPLICATION

This application is based on and claims priority under 35 USC 119 from Japanese Patent Application No. 2010-238010 filed Oct. 22, 2010.

BACKGROUND

1. Technical Field

The invention relates to a detection device and an image forming apparatus.

SUMMARY

The invention provides a detection device and an image forming apparatus having the same, capable of suppressing a cavity effect in which a regular reflected beam reflected from a medium is reflected again from a transmissive member toward the medium to change the luminance thereof.

A first aspect of the invention provides a detection device including: a detection member that includes an emission member emitting a beam toward a direction of a transportation path transporting a medium thereon and a beam receiving member receiving a reflected beam emitted from the emission member and reflected from the medium transported along the transportation path, and that detects an image formed on the medium transported along the transportation path or the medium; a transmissive member that is provided to allow a regular reflected beam of the beam reflected from the medium to be obliquely incident thereto, and through which the beam emitted from the emission member is transmitted; and a multiple-layered antireflective film that is provided on the transmissive member, the antireflective film being formed such that a maximum value of reflectivity of a first incident beam incident at the same angle as an incident angle of the regular reflected beam becomes smaller than a maximum value of reflectivity of a second incident beam incident in the direction perpendicular to the transmissive member within a visible light wavelength range.

BRIEF DESCRIPTION OF THE DRAWINGS

Exemplary Embodiments of the present invention will be described in detail based on the following figures, wherein.

DETAILED DESCRIPTION

Figure 1:
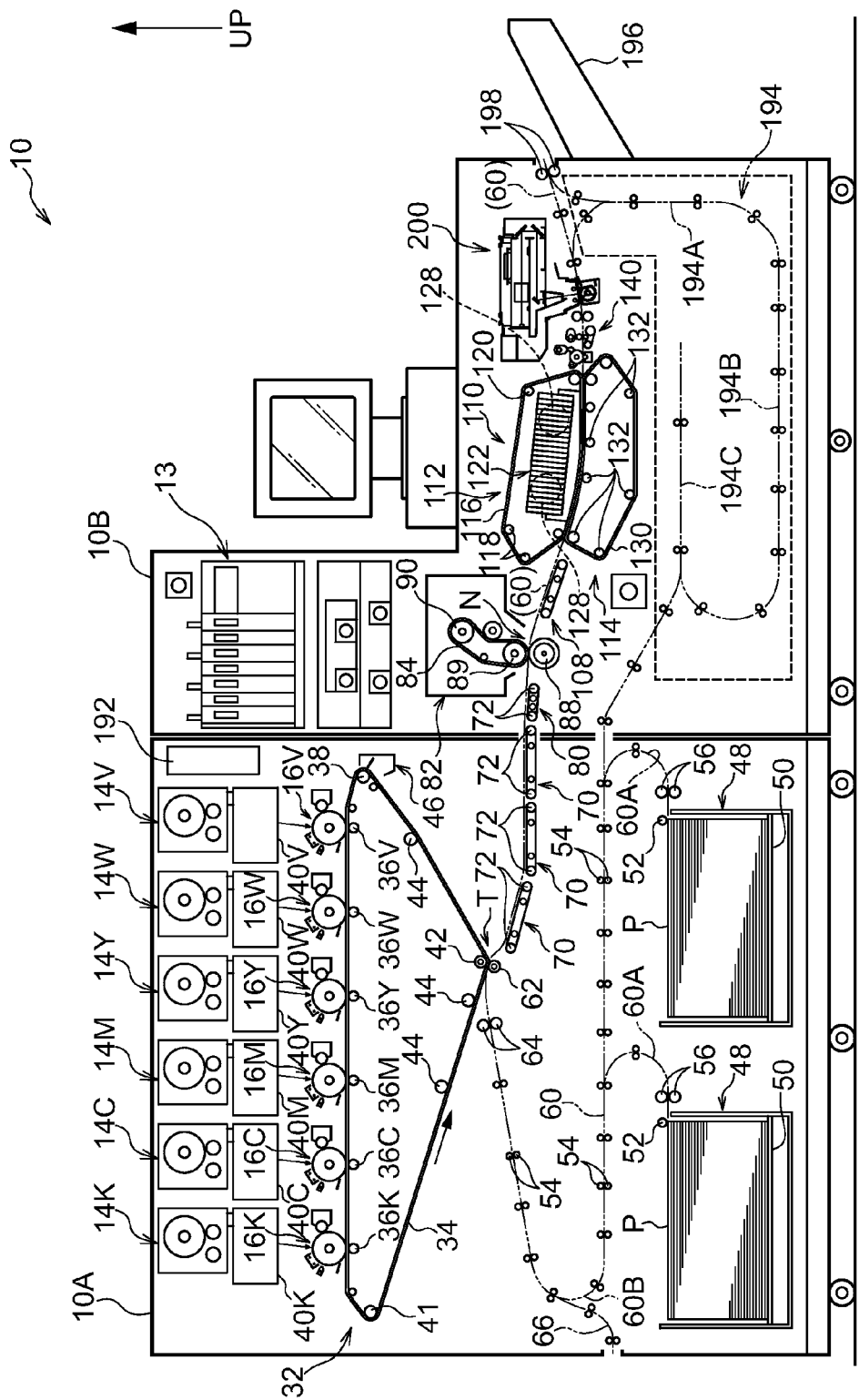
FIG. 1 is a schematic configuration diagram showing an entire image forming apparatus according to an exemplary embodiment of the invention.

Hereinafter, an exemplary embodiment according to the invention will be described in detail with reference to the accompanying drawings. Further, for convenience of description, the arrow "UP" shown in FIG. 1 is set as the upward direction. Furthermore, in the following description, the upstream side in the transportation direction and the downstream side in the transportation direction of a recording medium P as an example of a medium which is a sheet-like member respectively may be simply referred to as an "upstream" and a "downstream."

(Overall Configuration)

An image forming apparatus 10 according to the exemplary embodiment forms a full color image or a monochrome image, and as shown in FIG. 1, the image forming apparatus includes a first housing 10A which accommodates a first processing unit constituting a portion at one side of the horizontal direction (the left side of FIG. 1) and a second housing 10B which is separably connected to the first housing 10A and accommodates a second processing unit constituting a portion at the other side of the horizontal direction (the right side of FIG. 1).

An image signal processing unit 13 is provided at the upper portion of the second housing 10B to perform an image process on image data transmitted from an external device such as a computer.

On the other hand, the upper portion of the first housing 10A is provided with toner cartridges 14V, 14W, 14Y, 14M, 14C, and 14K which are arranged in the horizontal direction in a replaceable manner and respectively accommodate toners of a first specific color (V), a second specific color (W), yellow (Y), magenta (M), cyan (C), and black (K).

Furthermore, the first specific color and the second specific color are appropriately selected from colors (including transparent colors) other than yellow, magenta, cyan, and black. Further, in the following description, if it is necessary to distinguish the respective components related to the first specific color (V), the second specific color (W), the yellow (Y), the magenta (M), the cyan (C), and the black (K), several characters V, W, Y, M, C, and K are added to the reference numerals thereof. On the other hand, if it is not necessary to distinguish the respective components related to the first specific color (V), the second specific color (W), the yellow (Y), the magenta (M), the cyan (C), and the black (K), several characters V, W, Y, M, C, and K are omitted.

Further, six image forming units 16 as examples of the image forming units correspond to the toners of the respective colors, and are disposed in the horizontal direction below the toner cartridges 14 to respectively correspond the toner cartridges.

An exposure device 40 provided for each image forming unit 16 is configured to receive the image data subjected to the image process using the image signal processing unit 13 from the image signal processing unit 13, and to emit a beam L modulated in accordance with the image data to an image carrier 18 described below (refer to FIG. 2).

Figure 2:
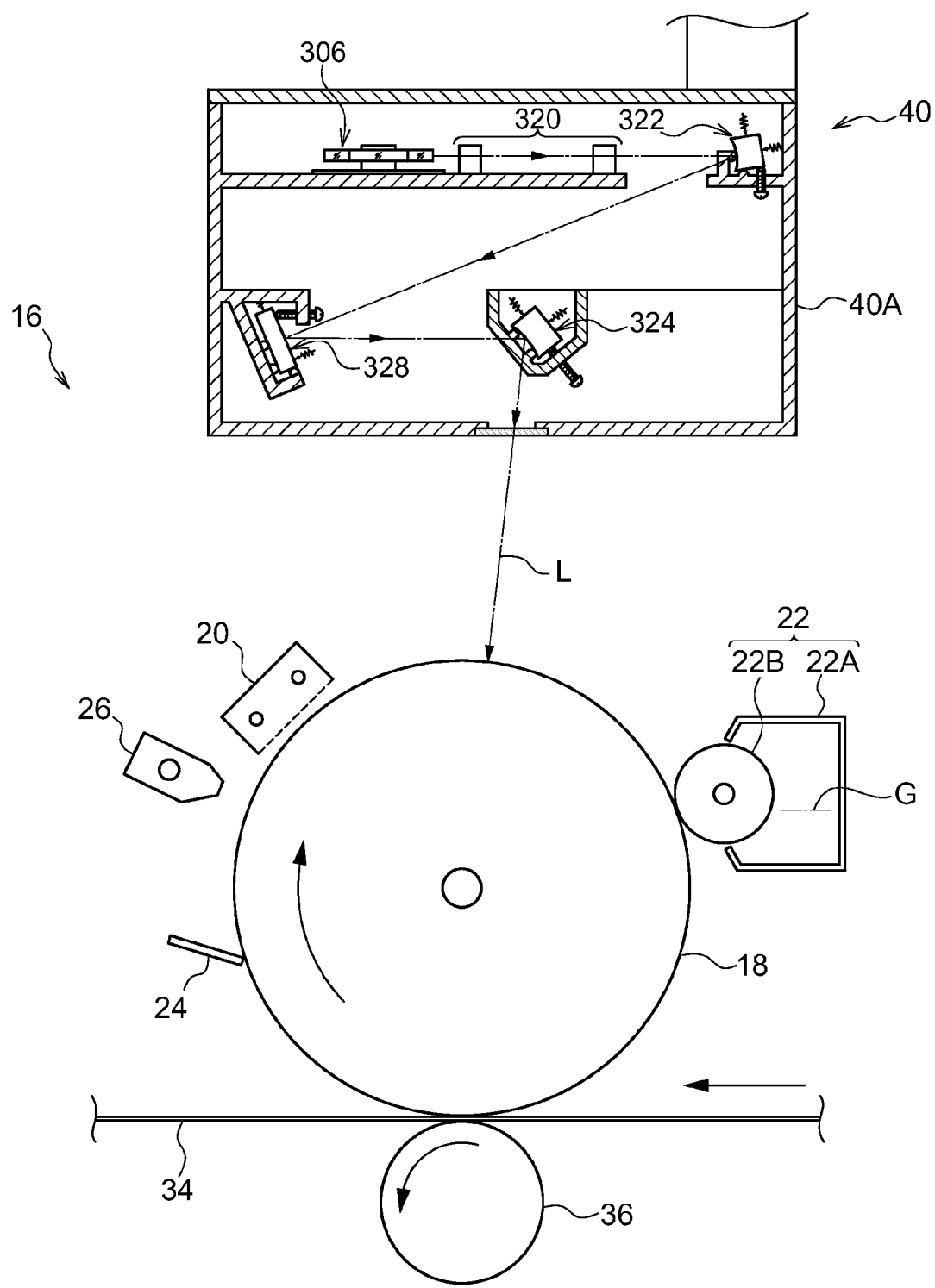
FIG. 2 is a schematic side view showing an image forming unit of the image forming apparatus according to the exemplary embodiment of the invention.

As shown in FIG. 2, each image forming unit 16 includes the image carrier 18 which is rotationally driven in one direction (the clockwise direction of FIG. 2). By emitting the beam L from each exposure device 40 to each image carrier 18, an electrostatic latent image is formed on each image carrier 18. Further, the exposure device 40 is described below in detail.

Around each image carrier 18, there are provided a corona discharge type (a non-contact charge type) scorotron charger 20 which charges the image carrier 18, a developing device 22 which develops the electrostatic latent image formed on the image carrier 18 by the exposure device 40 using a developing agent, a blade 24 which serves as a removing member removing the developing agent remaining on the image carrier 18 after a transfer operation, and a neutralization device 26 which performs a neutralization process by emitting a beam to the image carrier 18 after the transfer operation.

The scorotron charger 20, the developing device 22, the blade 24, and the neutralization device 26 are disposed to face the surface of the image carrier 18, and are sequentially arranged in this order from the upstream side in the rotation direction of the image carrier 18 to the downstream thereof.

The developing device 22 includes a developing agent accommodation member 22A which accommodates a developing agent G containing toner and a developing roll 22B which supplies the developing agent G accommodated in the developing agent accommodation member 22A to the image carrier 18. The developing agent accommodation member 22A is connected to the toner cartridge 14 (refer to FIG. 1) through a toner supply path (not shown), and toner is supplied from the toner cartridge 14 thereto.

As shown in FIG. 1, a transfer unit 32 is provided below each image forming unit 16. The transfer unit 32 includes an annular intermediate transfer belt 34 which contacts each image carrier 18 and a primary transfer roll 36 which serves as a primary transfer member transferring the toner image formed on each image carrier 18 onto the intermediate transfer belt 34 in multiple layers.

The intermediate transfer belt 34 is wound on a driving roll 38 driven by a motor (not shown), a tension applying roll 41 applying a tension to the intermediate transfer belt 34, an opposite roll 42 facing a secondary transfer roll 62 described below, and plural winding rolls 44, and is moved by the driving roll 38 to circulate in one direction (the counterclockwise direction of FIG. 1).

Each primary transfer roll 36 is disposed to face the image carrier 18 of each image forming unit 16 with the intermediate transfer belt 34 interposed therebetween. Further, a transfer bias voltage having polarity opposite to the polarity of the toner is applied to the primary transfer roll 36 by a power feeding unit (not shown). With this configuration, the toner image formed on the image carrier 18 is transferred onto the intermediate transfer belt 34.

A removing device 46 is provided at the opposite side of the driving roll 38 with the intermediate transfer belt 34 interposed therebetween to remove toner or paper dust, for example, remaining on the intermediate transfer belt 34 by allowing the blade to contact the intermediate transfer belt 34.

Two recording medium accommodation units 48 are provided below the transfer unit 32 along the horizontal direction to accommodate a recording medium P as an example of a medium such as a sheet. Each recording medium accommodation unit 48 is configured so as to be freely drawn out from the first housing 10A. A supply roll 52 is provided above one end side (the right side of FIG. 1) of each recording medium accommodation unit 48 to supply the recording medium P from each recording medium accommodation unit 48 to a transportation path 60 as an example of a transportation path.

A bottom plate 50 is provided inside each recording medium accommodation unit 48 to load the recording medium P thereon. The bottom plate 50 is configured to move downward by a command of a control unit (not shown) when the recording medium accommodation unit 48 is drawn out from the first housing 10A. When the bottom plate 50 moves downward, a space for allowing a user to supplement the recording medium P is formed in the recording medium accommodation unit 48.

When the recording medium accommodation unit 48 drawn out from the first housing 10A is attached to the first housing 10A, the bottom plate 50 is configured to move upward by the command of the control unit. As the bottom plate 50 moves upward, the uppermost recording medium P loaded on the bottom plate 50 contacts the supply roll 52.

A separation roll 56 is provided at the downstream side in the recording medium transportation direction of the supply roll 52 to separate one by one the recording medium P supplied from the recording medium accommodation unit 48 in an overlapping state. Plural transportation rolls 54 are provided at the downstream of the separation roll 56 to transport the recording medium P to the downstream side in the transportation direction.

The transportation path 60 provided between the recording medium accommodation unit 48 and the transfer unit 32 extends to the transfer position T between the secondary transfer roll 62 and the opposite roll 42 so that the recording medium P supplied from the recording medium accommodation unit 48 is folded back to the left side of FIG. 1 at a first folding back portion 60A and is folded back to the right side of FIG. 1 at a second folding back portion 60B.

A transfer bias voltage having polarity opposite to the polarity of the toner is applied to the secondary transfer roll 62 by a power feeding unit (not shown). With this configuration, the toner images of respective colors transferred onto the intermediate transfer belt 34 in multiple layers are secondly transferred onto the recording medium P transported along the transportation path 60 by the secondary transfer roll 62.

A preliminary path 66 extends from a side surface of the first housing 10A so as to be merged with the second folding back portion 60B of the transportation path 60. The recording medium P supplied from another recording medium accommodation unit (not shown) disposed adjacent to the first housing 10A is configured to enter the transportation path 60 through the preliminary path 66.

At the downstream of the transfer position T, plural transportation belts 70 are provided at the first housing 10A to transport the recording medium P having the toner image transferred thereto toward the second housing 10B, and a transportation belt 80 is provided at the second housing 10B to transport the recording medium P transported to the transportation belt 70 to the downstream.

Each of the plural transportation belts 70 and the transportation belt 80 is formed in an annular shape, and is wound on a pair of winding rolls 72. The pair of winding rolls 72 is respectively disposed at the upstream and the downstream side in the transportation direction of the recording medium P, and one winding roll rotates so that the transportation belt 70 (the transportation belt 80) circulates in one direction (the clockwise direction of FIG. 1).

Further, a fixing unit 82 as an example of a fixing device is provided at the downstream of the transportation belt 80 to fix the toner image transferred onto the surface of the recording medium P to the recording medium P by heat and pressure.

The fixing unit 82 includes a fixing belt 84 and a pressurizing roll 88 disposed to contact the lower side of the fixing belt 84. A fixing unit N is provided between the fixing belt 84 and the pressurizing roll 88 to fix the toner image by heating and pressurizing the recording medium P.

The fixing belt 84 is formed in an annular shape, and is wound on the driving roll 89 and the driven roll 90. The driving roll 89 faces the upper side of the pressurizing roll 88, and the driven roll 90 is disposed at the upper side of the driving roll 89. Each of the driving roll 89 and the driven roll 90 includes a heating unit such as a halogen heater. Accordingly, the fixing belt 84 is heated.

As shown in FIG. 1, a transportation belt 108 is provided at the downstream of the fixing unit 82 to transport the recording medium P supplied from the fixing unit 82 to the downstream. The transportation belt 108 has the same configuration as that of the transportation belt 70. A cooling unit 110 is provided at the downstream of the transportation belt 108 to cool the recording medium P heated by the fixing unit 82.

The cooling unit 110 includes an absorption device 112 which absorbs heat of the recording medium P and a pressing device 114 which presses the recording medium P against the absorption device 112. The absorption device 112 is disposed at one side of the transportation path 60 (the upper side of FIG. 1), and the pressing device 114 is disposed at the other side (the lower side of FIG. 1).

The absorption device 112 includes an annular absorption belt 116 which contacts the recording medium P and absorbs heat of the recording medium P. The absorption belt 116 is wound on a driving roll 120 transmitting a driving force to the absorption belt 116 and plural winding rolls 118.

A heat sink 122 made of aluminum is provided at the inner peripheral side of the absorption belt 116 to come into plane-contact with the absorption belt 116 and to emit heat absorbed to the absorption belt 116. Furthermore, a fan 128 is disposed at the rear side of the second housing 10B (the rear side of the paper of FIG. 1) to absourb heat from the heat sink 122 and discharge the heat to the outside of the heat sink 122.

The pressing device 114 pressing the recording medium P against the absorption device 112 includes an annular press belt 130 which transports the recording medium P while pressing the recording medium P against the absorption belt 116. The press belt 130 is wound on plural winding rolls 132.

A correction device 140 is provided at the downstream of the cooling unit 110 to correct a curl of the recording medium P while transporting the recording medium P in an interposed state.

An inline sensor 200 is provided at the downstream of the correction device 140 as an example of a detection device detecting a toner density defect, an image defect, an image position defect of the toner image fixed to the recording medium P, and a position or a shape of the recording medium P, for example. Furthermore, the inline sensor 200 is described below in detail.

A discharge roll 198 is provided at the downstream of the inline sensor 200 to discharge the recording medium P having an image formed on one surface thereof to a discharge unit 196 attached to a side surface of the second housing 10B.

On the other hand, when an image is formed on both surfaces of the recording medium P, the recording medium P supplied from the inline sensor 200 is transported to a reversing path 194 provided at the downstream of the inline sensor 200.

The reversing path 194 includes a branch path 194A which is branched from the transportation path 60, a sheet transportation path 194B which transports the recording medium P transported along the branch path 194A toward the first housing 10A, and a reversing path 194C which folds back the recording medium P transported along the sheet transportation path 194B in the reverse direction for switchback transformation so that the front and rear surfaces thereof are reversed.

With this configuration, the recording medium P subjected to switchback transformation at the reversing path 194C is transported toward the first housing 10A, enters the transportation path 60 provided above the recording medium accommodation unit 48, and is transported to the transfer position T again.

Next, an image forming process of the image forming apparatus 10 will be described. The image data subjected to the image process at the image signal processing unit 13 is transmitted to each exposure device 40. In each exposure device 40, each beam L is emitted therefrom in accordance with the image data to expose each image carrier 18 charged by the scorotron charger 20 so that an electrostatic latent image is formed thereon.

As shown in FIG. 2, the electrostatic latent image formed on the image carrier 18 is developed by the developing device 22 so that the toner images of respective colors of the first specific color (V), the second specific color (W), the yellow (Y), the magenta (M), the cyan (C), and the black (K) are formed.

As shown in FIG. 1, the toner images of respective colors formed on the image carriers 18 of the image forming units 16V, 16W, 16Y, 16M, 16C, and 16K are sequentially transferred to the intermediate transfer belt 34 by using six primary transfer rolls 36V, 36W, 36Y, 36M, 36C, and 36K in multiple layers.

The toner images of respective colors transferred onto the intermediate transfer belt 34 in multiple layers are secondly transferred onto the recording medium P transported from the recording medium accommodation unit 48 by the secondary transfer roll 62. The recording medium P having the toner images transferred thereto is transported to a fixing unit 82 provided inside the second housing 10B by the transportation belt 70.

By heating and pressurizing the toner images of respective colors formed on the recording medium P using the fixing unit 82, the toner images are fixed onto the recording medium P. Furthermore, the recording medium P having the toner images fixed thereto is cooled after passing through the cooling unit 110 and is transported to the correction device 140 so that the curl generated in the recording medium P is corrected.

The recording medium P of which the curl is corrected is detected regarding to an image defect or the like by the inline sensor 200, and then is discharged to the discharge unit 196 by the discharge roll 198.

On the other hand, when an image is formed on a non-imaged surface at which an image has not been formed thereon (when an image is formed on both surfaces), the recording medium P passing through the inline sensor 200 is reversed at the reversing path 194, and is transported to the transportation path 60 provided above the recording medium accommodation unit 48. Then, the toner images are formed on the rear surface in accordance with the above-described procedure.

Furthermore, in the image forming apparatus 10 according to the exemplary embodiment, the components (the image forming units 16V and 16W, the exposure devices 40V and 40W, the toner cartridges 14V and 14W, and the primary transfer rolls 36V and 36W) forming the images of the first specific color and the second specific color may be attached to the first housing 10A as an additional component in accordance with the selection of the user. Accordingly, the image forming apparatus 10 may not include the components forming the images of the first specific color and the second specific color or may include only the components forming the images of one of the first specific color and the second specific color.

Next, the inline sensor 200 will be described.

In the following description, the length direction of the image forming apparatus 10 (the secondary scanning direction as the transportation direction of the recording medium P) is set as the X direction, the height direction of the apparatus is set as the Y direction, and the depth direction of the apparatus (the primary scanning direction) is set as the Z direction.

(Basic Configuration and Function of Inline Sensor)

Figure 3:
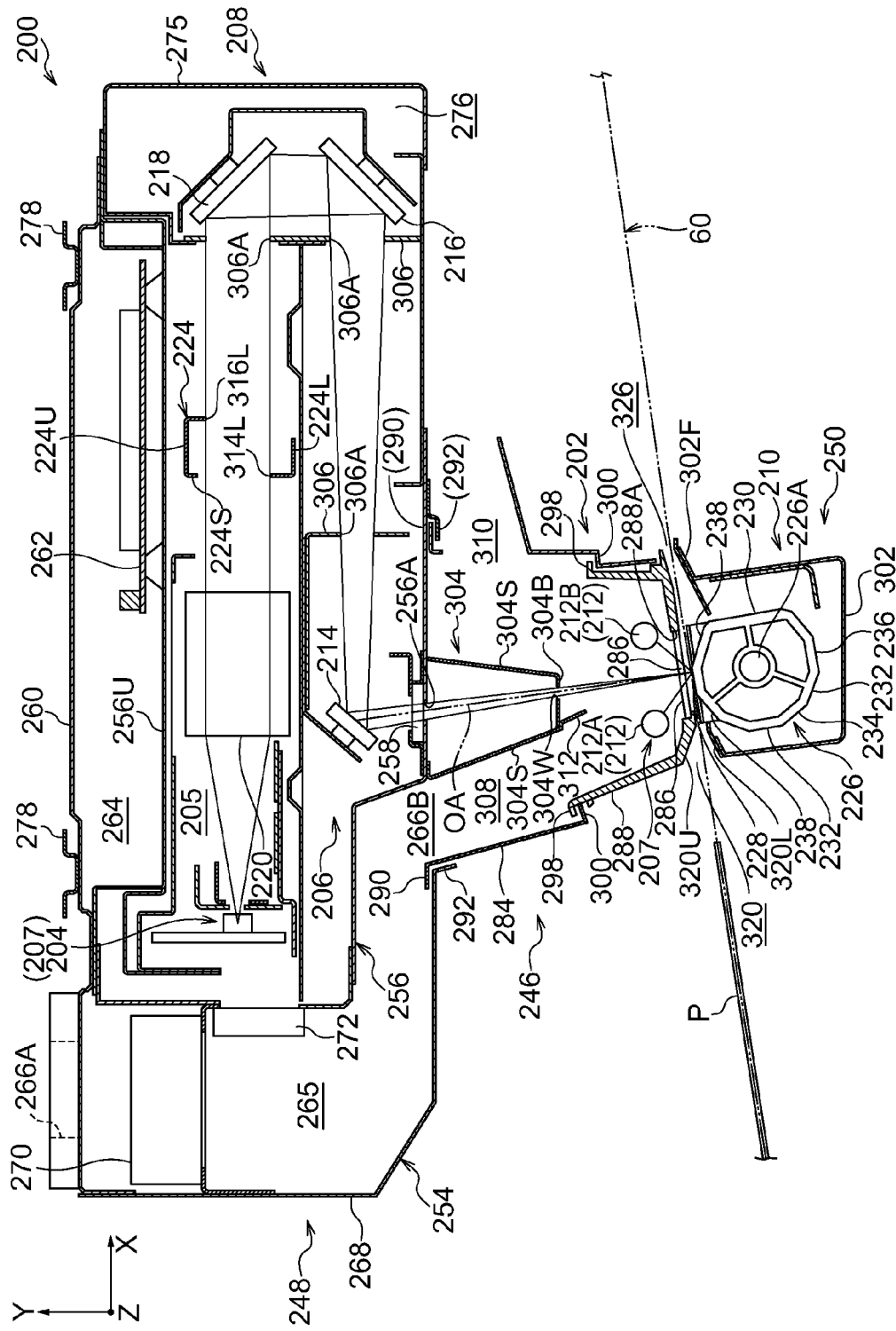
FIG. 3 is a schematic cross-sectional view showing a configuration of an inline sensor according to the exemplary embodiment of the invention.

As shown in FIG. 3, the inline sensor 200 includes an emission unit 202 which emits a beam toward the recording medium P having an image formed thereon, an imaging unit 208 which has an imaging optical system 206 forming an image at a CCD sensor 204 as an example of a beam receiving member receiving a beam emitted from the emission unit 202 and reflected from the recording medium P, and a setting unit 210 which sets various reference values, for example, for the use or the calibration of the inline sensor 200. The CCD sensor 204 receives the beam reflected from the recording medium P and detects the image or the recording medium P on the basis of the intensity of the beam.

Furthermore, the beam from the recording medium P includes the beam reflected from the recording medium P and the beam transmitted through the recording medium P, and in a broad sense, the beam is a beam used to detect information on the image formed on the recording medium P or the position or the shape of the recording medium P. Further, the transmitted beam includes the beam not only passing through the window glass, for example, but also the beam passing through the imaging lens, for example. Furthermore, the detection of the recording medium P includes the detection of the position and the shape of the recording medium P.

The emission unit 202 is disposed above the transportation path 60 of the recording medium P, and includes a pair of lamps 212 as examples of emissive members. Each lamp 212 is a xenon lamp which is elongated in the Z direction, and the length of the emission range is larger than the width of the maximum recording medium P to be transported.

The pair of lamps 212 is symmetrically disposed about the optical axis OA (the optical axis in design) reflected from the recording medium P and directed toward the imaging unit 208. More specifically, the lamps 212 are symmetrically disposed about the optical axis OA so that the emission angle θ (refer to FIGS. 7 and 9) thereof with respect to the recording medium P is from 45° to 50° (desirably, 50°).

Specifically, the pair of lamps 212 includes a first lamp 212A which is an example of a first beam source provided at the upstream side in the transportation direction of the recording medium P and a second lamp 212B which is a second beam source provided at the opposite side of the first lamp 212A (at the downstream side in the transportation direction of the recording medium P) with the optical axis OA interposed therebetween. Furthermore, the CCD sensor 204, the lamp 212, and a window glass 286 as an example of a transmissive member described below constitute a detection unit 207 as an example of a detection member. Then, the image of the recording medium P being transported is detected by the detection unit 207.

The imaging optical system 206 mainly includes a first mirror 214 which reflects a beam guided along the optical axis OA in the X direction (in the exemplary embodiment, the downstream side in the transportation direction of the recording medium P), a second mirror 216 which reflects the beam reflected by the first mirror 214 upward, a third mirror 218 which reflects the beam reflected by the second mirror 216 toward the upstream side in the transportation direction of the recording medium P, and a lens 220 which concentrate the beam reflected by the third mirror 218 on the CCD sensor 204 (so that an image is formed thereon). The CCD sensor 204 is disposed at the upstream side in the transportation direction of the recording medium P with respect to the optical axis OA.

The length of the first mirror 214 in the Z direction is larger than the width of the maximum recording medium P. Then, the first mirror 214, the second mirror 216, and the third mirror 218 reflect the beam reflected from the recording medium P and entering the imaging optical system 206 while narrowing it in the Z direction (the secondary scanning direction). Accordingly, the reflected beams from the respective portions of the recording medium P in the width direction enter the substantially cylindrical lens 220.

With the above configuration, in the inline sensor 200, the CCD sensor 204 is configured to output (feed-back) a signal in accordance with the imaged beam, that is, the image density to a control device 192 of the image forming apparatus 10 (refer to FIG. 1). The control device 192 is configured to correct an image formed in the image forming unit 16 on the basis of the signal from the inline sensor 200. In the image forming apparatus 10, as an example, the intensity of the emitted beam, the image formation position, and the like of the exposure device 40 are corrected on the basis of the signal from the inline sensor 200.

Further, a beam quantity diaphragm unit 224 is provided between the third mirror 218 and the lens 220 of the imaging optical system 206. The beam quantity diaphragm unit 224 decreases the quantity of the beam crossing the optical path in the Z direction and imaged at the CCD sensor 204 in the Y direction (the direction intersecting the primary scanning direction) and adjusts the degree of the beam quantity diaphragm through an operation from the outside. The degree of the beam quantity diaphragm using the beam quantity diaphragm unit 224 may be adjusted so that the quantity of the beam imaged at the CCD sensor 204 becomes a predetermined quantity even when the beam emission quantity of each lamp 212 changes with the elapse of time.

On the other hand, the setting unit 210 includes a reference roll 226 which is an example of a reference member elongated in the Z direction. The reference roll 226 includes a detection reference surface 228 which is directed toward the transportation path 60 when the image detection of the recording medium P is performed by the inline sensor 200, a retreat surface 230 which is directed toward the transportation path when the image detection of the recording medium P is not performed by the inline sensor 200, a white reference surface 232, a color reference surface 234 in which plural color patterns are formed along the length direction, and a complex detection surface 236 in which plural detection patterns are formed.

In the exemplary embodiment, the reference roll 226 is formed in a polygonal cylindrical shape having eight or more surfaces in the circumferential direction. Each of the detection reference surface 228, the retreat surface 230, the color reference surface 234, and the complex detection surface 236 has only one surface, and the white reference surface 232 has two surfaces.

The reference roll 226 is configured to switch the surface directed toward the transportation path 60 while rotating about the rotation shaft 226A. The switching of the surface of the reference roll 226 is performed by a control circuit provided at a circuit board 262 described below. Further, since the reference roll 226 is formed in a cylindrical shape having a polygonal cross-section with eight corners or more, a difference in distance between the center of each surface in the circumferential direction and the corner portion of the surfaces with respect to the rotation center is suppressed to be small.

Accordingly, the corner portion of the surfaces of the reference roll 226 is not interfered with by the emission unit 202 while a distance between each surface of the reference roll 226 and the emission position of each lamp 212 (the window glass 286 described below) is suppressed to be small.

The circumferential width of the detection reference surface 228 is smaller than those of the other surfaces, and both circumferential surfaces are formed as guide surfaces 238 not functioning as the above reference. The detection reference surface 228 is formed as a position reference surface that positions a detection target surface (a reading surface) of the recording medium P to be transported to the emission position of each lamp 212.

The circumferential width of the retreat surface 230 is larger than those of other surfaces. The retreat surface 230 is used as a guide surface guiding the recording medium P when the image detection of the recording medium P is not performed by the inline sensor 200, and the distance from the axis of the rotation shaft 226A to the retreat surface 230 is set to be smaller than that from the detection reference surface 228 to the retreat surface 230.

Accordingly, when the image detection of the recording medium P is not performed by the inline sensor 200, the distance from the transportation path 60 to the emission unit 202 (the window glass 286) is wider than that of the case where the image detection of the recording medium P is performed by the inline sensor 200.

The white reference surface 232 is used for the calibration of the imaging optical system 206, and a white film is stuck thereto so that the white reference surface 232 is used as a reference allowing a predetermined signal to output from the imaging optical system 206. The color reference surface 234 is used for the calibration of the imaging optical system 206, and a film having a pattern of a reference color is stuck thereto so that the color reference surface 234 is used as a reference allowing a predetermined signal to output from the imaging optical system 206 in accordance with each color.

Figure 5:
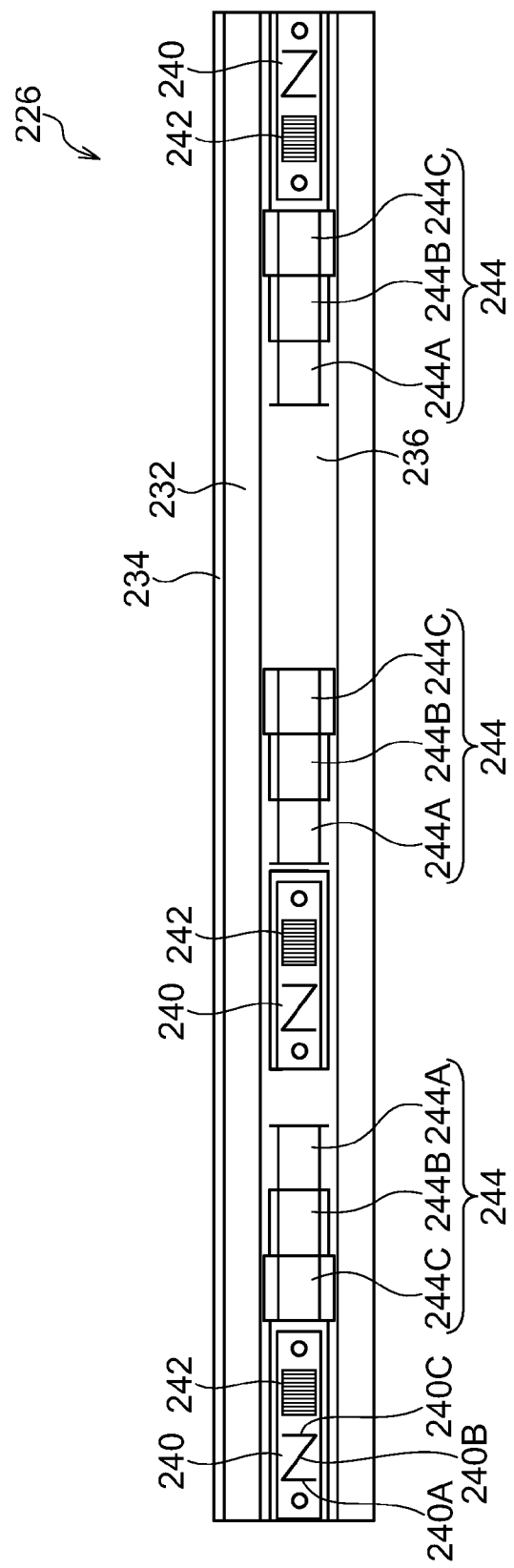
FIG. 5 is a schematic plan view showing a complex surface of a reference roll of the inline sensor according to the exemplary embodiment of the invention.

As shown in FIG. 5, the complex detection surface 236 has a configuration in which a depth detection pattern 244, a focus detection pattern 242, and a position adjustment pattern 240 calibrating the position of the reference roll 226 in the rotation direction (in the transportation direction of the recording medium P) are disposed at the same surface.

The position adjustment pattern 240 is formed in a manner such that a film having a white background is stuck thereto so that the N-shaped vertical line of the black N-shaped pattern is formed on the film along the transportation direction of the recording medium P. The focus detection pattern 242 is formed in a manner such that a film having a white background is stuck thereto so that plural black lines along the transportation direction of the recording medium P are formed in parallel on the film as a ladder pattern.

The depth detection pattern 244 is formed in a manner such that a film material having a pattern with three white surfaces 244A, 244B, and 244C having different distances from the rotation shaft 226A of the reference roll 226 disposed in a step shape in the length direction of the complex detection surface 236.

At least one position adjustment pattern 240 is provided for each of both ends of the length direction of the complex detection surface 236. Further, the focus detection pattern 242 is disposed to be adjacent to the center side in the length direction of the complex detection surface 236 with respect to the position adjustment pattern 240 disposed at the above both ends. Three depth detection patterns 244 are provided in total to be respectively disposed at both end sides of the length direction of the complex detection surface 236 and the center portion thereof. In the exemplary embodiment, one position adjustment pattern 240 and one focus detection pattern 242 are disposed between the depth detection pattern 244 disposed at the center and the depth detection pattern 244 disposed at one end in the length direction.

Next, a calibration procedure of the CCD sensor 204 will be described.

As shown in FIG. 3, the white reference surface 232 is first directed toward the transportation path 60 of the recording medium P. The CCD sensor 204 outputs a shading correction signal correcting the distribution of the quantity of the beam in the Z direction (the primary scanning direction). Subsequently, the complex detection surface 236 is directed toward the transportation path 60 of the recording medium P, and the detection position using the CCD sensor 204 is automatically adjusted in the transportation direction of the recording medium P in accordance with the position adjustment pattern 240.

That is, as shown in FIG. 5, two linear portions 240A, 240C and an oblique portion 240B therebetween are detected by detecting the N-shaped pattern in the Z direction (the primary scanning direction). Then, the reference roll 226 is rotated so that the distance between the linear portion 240A and the oblique portion 240B becomes equal to the distance between the linear portion 240C and the oblique portion 240B, and the detection position is adjusted.

As shown in FIG. 3, after the detection position is adjusted in the transportation direction of the recording medium P, the focus of the CCD sensor 204 is checked by the focus detection pattern 242, and the illumination depth degree is checked by the depth detection pattern 244. Furthermore, the color reference surface 234 is directed toward the transportation path 60 of the recording medium P. The CCD sensor 204 is automatically adjusted so that a signal having a predetermined intensity is output for each color.

Furthermore, as described above, the calibration of the CCD sensor 204 is performed, for example, when the image forming apparatus 10 is turned on (once per day). On the other hand, the calibration of the image forming apparatus 10 (the adjustment of the exposure device 40 described above, for example) based on the signal of the CCD sensor 204 is performed, for example, whenever an image is formed on a predetermined quantity of the recording medium P or more (ten times per day).

(Separation Structure of Inline Sensor)

The above inline sensor 200 may be separated into three units, that is, the center unit 246 mainly including the emission unit 202, the upper unit 248 mainly including the imaging unit 208, and the lower unit 250 mainly including the setting unit 210.

The upper unit 248 is slidably attached to or detached from the second housing 10B of the image forming apparatus 10 (refer to FIG. 1) in the Z direction. The center unit 246 is slidably attached to or detached from the upper unit 248 in the Z direction. The lower unit 250 is slidably attached to or detached from the center unit 246 and the upper unit 248 in the Z direction.

Furthermore, the lower unit 250 disposed at the lower side of the transportation path 60 of the recording medium P is supported by a lower drawer (not shown) which is drawn from the second housing 10B in order to solve the jamming of the recording medium P, and the lower unit 250 is attachable to or detachable from the center unit 246 and the upper unit 248 when drawing out or inserting the lower drawer. Hereinafter, this will be described in detail.

(Configuration of Upper Unit)

The upper unit 248 includes an upper housing 254. The upper housing 254 accommodates the imaging unit 208 and the circuit board 262 described below, and constitutes a duct 265 or the like which is an example of a cooling air main passage. The upper housing 254 includes an imaging system housing 256 as an example of a first open member accommodating the CCD sensor 204 and the imaging optical system 206.

The imaging system housing 256 has a substantially rectangular box shape to be elongated in the X direction when seen from the Z direction, and one end in the X direction (in the exemplary embodiment, the upstream end in the transportation direction of the recording medium P) accommodates the CCD sensor 204. Further, the other end of the imaging system housing 256 in the X direction is provided with the second mirror 216 and the third mirror 218.

Then, the substantially center portion of the imaging system housing 256 in the X direction is provided with a window portion 256A which is an example of a first passage hole to which a beam is incident along the optical axis OA. In the imaging system housing 256, the window portion 256A is blocked by a window glass 258 through which a beam is transmitted, whereby the interior thereof is formed as an air-tightly sealed space and an optical chamber 250 accommodating the CCD sensor 204, for example, are provided.

Further, the upper housing 254 includes the upper cover 260 which covers the upper side of the imaging system housing 256. Accordingly, a substrate chamber 264 is provided between an upper wall 256U of the imaging system housing 256 and the upper cover 260 to accommodate the circuit board 262.

Further, the upper housing 254 includes a duct cover 268 forming the duct 265 at the outside of one end in the X direction as the side where the CCD sensor 204 is disposed in the imaging system housing 256. The duct cover 268 covers the above end of the imaging system housing 256 at the upstream side in the transportation direction of the recording medium P and at the side of the sheet transportation path 60, and forms the duct 265 having an L-shaped X-Y cross-section.

The upper end of the duct 265 is formed as an air introduction port 266A, and the end of the duct 265 opposite to the air introduction port 266A is formed as a connection port 266B connected to a duct 308 as an example of a first air passage of a lamp housing 284 described below. A fan 270 is disposed in the duct 265 to generate an air stream moving from the upper side of the interior of the duct 265 to the lower side thereof.

Figure 4:
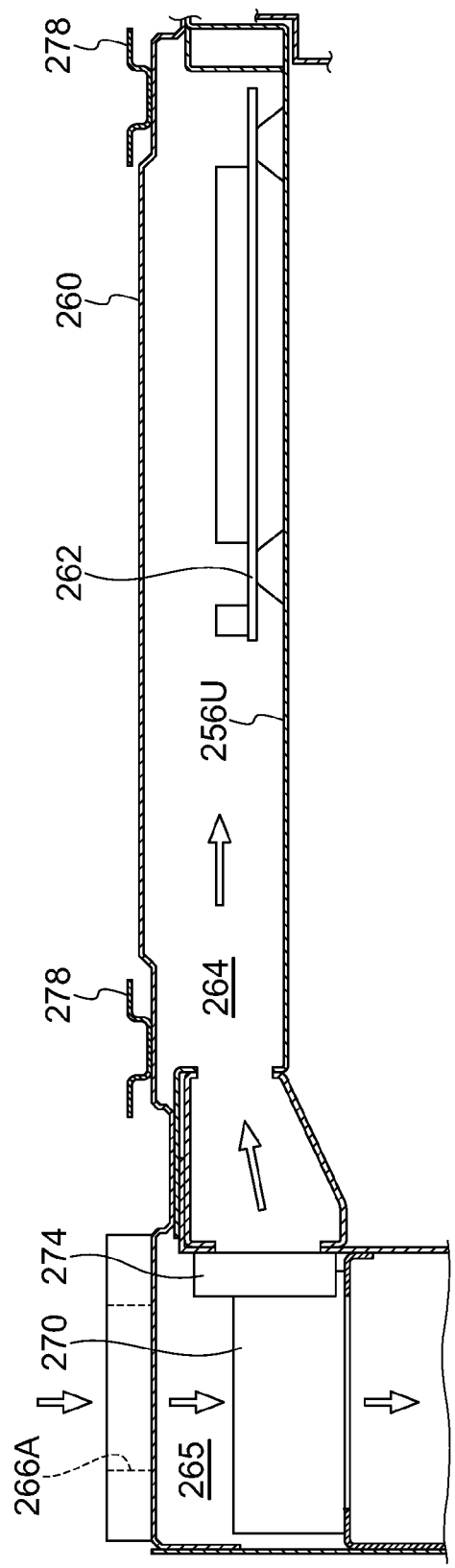
FIG. 4 is a schematic cross-sectional view showing a partial configuration of the inline sensor according to the exemplary embodiment of the invention.

Further, a fan 272 is disposed in the duct 265 to supply air into the optical chamber 205 provided at the imaging system housing 256 (to allow the optical chamber 205 to have a positive pressure). Furthermore, a fan 274 (refer to FIG. 4) is provided at the duct 265 to supply air into the substrate chamber 264.

Furthermore, the upper housing 254 includes a cover 275 which covers the imaging system housing 256 at the side of the second mirror 216 and the third mirror 218. The cover 275 forms an insulation space 276 between the cover 275 and the imaging system housing 256.

A slider 278 is provided at the upper housing 254 to be elongated in the Z direction. In the exemplary embodiment, a pair of sliders 278 is provided at the upper cover 260 to be in parallel as depicted by the arrow in the X direction. Each slider 278 is fittable to a rail provided at a frame (not shown) of the second processing unit 10B. Accordingly, each slider 278 moves in the Z direction while being guided on the rail so that the upper unit 248 moves with respect to the second processing unit 10B.

(Configuration of Center Unit)

The center unit 246 includes the lamp housing 284 accommodating the pair of lamps 212 and a window cover 288 holding the window glass 286 through which the beam of the lamp 212 is transmitted toward the recording medium P. The window glass 286 is disposed between the transportation path 60 of the recording medium P and the lamp 212 to face the transportation path 60. Further, the lamp housing 284 is formed in a box shape opened upward and downward, the upper open end is blocked by the upper housing 254, and the lower open end is blocked by the window cover 288.

Then, in the emission unit 202, a beam emitted from each lamp 212 is emitted to the recording medium P through the window glass 286, and the beam reflected from the recording medium P enters the lamp housing 284 along the optical axis OA through (while being transmitted through) the window glass 286. The beam reflected from the recording medium P and entering the lamp housing 284 is guided into the imaging unit 208 through the window glass 258 of the imaging system housing 256 constituting the imaging unit 208.

The lamp housing 284 includes a pair of sliders 290 protruding in a flange shape in the direction indicated by the arrow of the X direction from the upper open edge and elongated in the Z direction. Each slider 290 is fitted to a rail 292 formed in the upper housing 254. Accordingly, each slider 290 moves while being guided on the rail 292 so that the lamp housing 284 is attachable to or detachable from the upper housing 254 (the upper unit 248) in the Z direction.

The edge of the window cover 288 and the edge of the window glass 286 are formed not to be directed toward the upstream side in the transportation direction of the recording medium P. Both longitudinal ends of the window glass 286 are pressed by the window cover 288 through an attachment spring (not shown) in a posture of blocking a window portion 288A formed in the window cover 288. That is, the window glass 286 is attachable to or detachable from the window cover 288.

Further, the window cover 288 is attachable to or detachable from the lamp housing 284. Specifically, the X-Y cross-sectional shape of the window cover 288 is formed in a C-shape so that the upper side is open, and the edge of the open portion is provided with a pair of sliders 298. The slider 298 is fitted to a rail 300 formed in the lamp housing 284.

Accordingly, each slider 298 moves while being guided along the rail 300, and the window cover 288 is configured to be attachable to or detachable from the window glass 286 in the Z direction. With the above-described configuration, in the inline sensor 200, the window cover 288 may be replaced or cleaned as a single component.

Although not shown in the drawings, the center unit 246 and the upper unit 248 are highly precisely positioned in the X, Y, and Z directions by a pin and a hole which are inserted and separated with the relative movement in the Z direction. Further, the upper unit 248 and the housing are highly precisely positioned in the X, Y, and Z directions by a pin and a hole which are inserted and separated with the relative movement in the Z direction.

(Configuration of Lower Unit)

The lower unit 250 includes a lower housing 302 accommodating the reference roll 226 and a motor (not shown) driving the reference roll 226. As described above, the lower housing 302 is supported by the lower drawer and is positioned to the lower drawer in the Z direction.

Further, the lower unit 250, the center unit 246, and the upper unit 248 are highly precisely positioned in the X, Y, and Z directions by a pin and a hole which are inserted and separated with the relative movement in the Z direction. Accordingly, the lower unit 250 having the transportation path 60 of the recording medium P between the center unit 246 and the lower unit 250 is positioned with respect to the center unit 246 and the upper unit 248 in the X, Y, and Z directions.

(Countermeasure for Stray Light)

Further, a baffle 304 as an example of a second open member is provided inside the lamp housing 284 to surround the optical axis OA above the pair of lamps 212. As shown in FIG. 3, the baffle 304 includes at least a pair of side walls 304S as an example of a side portion and a bottom wall 304B as an example of a bottom portion.

In the exemplary embodiment, the pair of side walls 304S is connected to each other at a pair of walls 304F and 304R facing each other in the Z direction. The bottom wall 304B is provided with a lower window portion 304W as an example of a second passage hole where the optical axis OA enters. The upper open end of the baffle 304 surrounds a window portion 256A of the imaging system housing 256. Accordingly, a beam traveling along the optical axis OA enters the imaging unit 208 through the interior of the baffle 304.

The dimension of the baffle 304 is set so that the beam emitted from the rear side of each lamp 212 does not reach the window portion 256A. That is, the position of the open edge of the lower window portion 304W is set so that the beam emitted from the rear side of each lamp 212 does not directly reach the window portion 256A. Further, the inclination angle of the side wall 304S with respect to the optical axis OA is set so that the beam does not reach the window portion 256A even when the beam emitted from the rear side of each lamp 212 is reflected once.

As shown in FIG. 3, plural partition walls 306 are disposed inside the imaging system housing 256 to define a portion other than a beam guiding path of the imaging optical system 206. Each partition wall 306 includes an open portion 306A of which the size (upper limit) of the beam passing portion is set in a degree that the diffusion beam reflected from the recording medium P is not narrowed in the Y and Z directions in accordance with the diffusion angle of the beam reflected from the recording medium P and transmitted through the window glass 286.

(Air Flow)

Further, the duct 308 is formed inside the lamp housing 284 by the side wall 304S and the peripheral wall of the lamp housing 284 at one side (in the exemplary embodiment, the upstream side in the transportation direction of the recording medium P). The upper open end of the duct 308 is connected to the duct 265 through the connection port 266B while the lamp housing 284 is attached to the upper housing 254. Accordingly, the air stream generated by the operation of the fan 270 is also generated inside the lamp housing 284.

An air discharge port 310 is formed at a portion located at the opposite side of the duct 308 in the X direction of the peripheral wall of the lamp housing 284. Accordingly, the air stream from the duct 265 is guided inside the lamp housing 284 by the peripheral wall of the lamp housing 284 and the window cover 288, flows through the first lamp 212A at the upstream side in the transportation direction of the recording medium P and the second lamp 212B at the downstream side therein, and is discharged to the outside of the lamp housing 284 through the air discharge port 310.

Further, a protrusion portion 312 protrudes from the lower end of the side wall 304S constituting the duct 308, as an example of a shading portion to prevent the beam emitted from the rear side of the first lamp 212A from reaching the lower window portion 304W. The protrusion amount of the protrusion portion 312 is set so that the pair of lamps 212 is equally cooled by the air stream flowing toward the pair of lamps 212.

(Beam Quantity Diaphragm Unit)

The beam quantity diaphragm unit 224 includes a side wall 224S, an upper wall 224U, and a lower wall 224L, and the X-Y cross-sectional shape thereof is formed in a C-shape to be opened toward the third mirror 218. A substantially rectangular open portion 314 is formed at the side wall 224S of the beam quantity diaphragm unit 224. Further, a rib 316 is suspended from a free end of the upper wall 224U. The beam quantity diaphragm unit 224 cuts the beam reflected from the recording medium P and transmitting through the window glass 286 at a lower edge 314L of the open portion 314 and a lower end 316L of the rib 316, and decreases the quantity of the beam in the Y direction.

One end of the beam quantity diaphragm unit 224 in the length direction reaches the front wall of the imaging system housing 256, and one end of the beam quantity diaphragm unit 224 in the length direction is attached with an adjustment lever (not shown) through an operation hole formed in the wall. Then, the beam quantity diaphragm unit 224 rotates with the operation of the adjustment lever and moves in a posture of gradually decreasing the aperture amount from the initial position where the quantity of the beam is the smallest.

(Jamming Prevention Structure)

Figure 6:
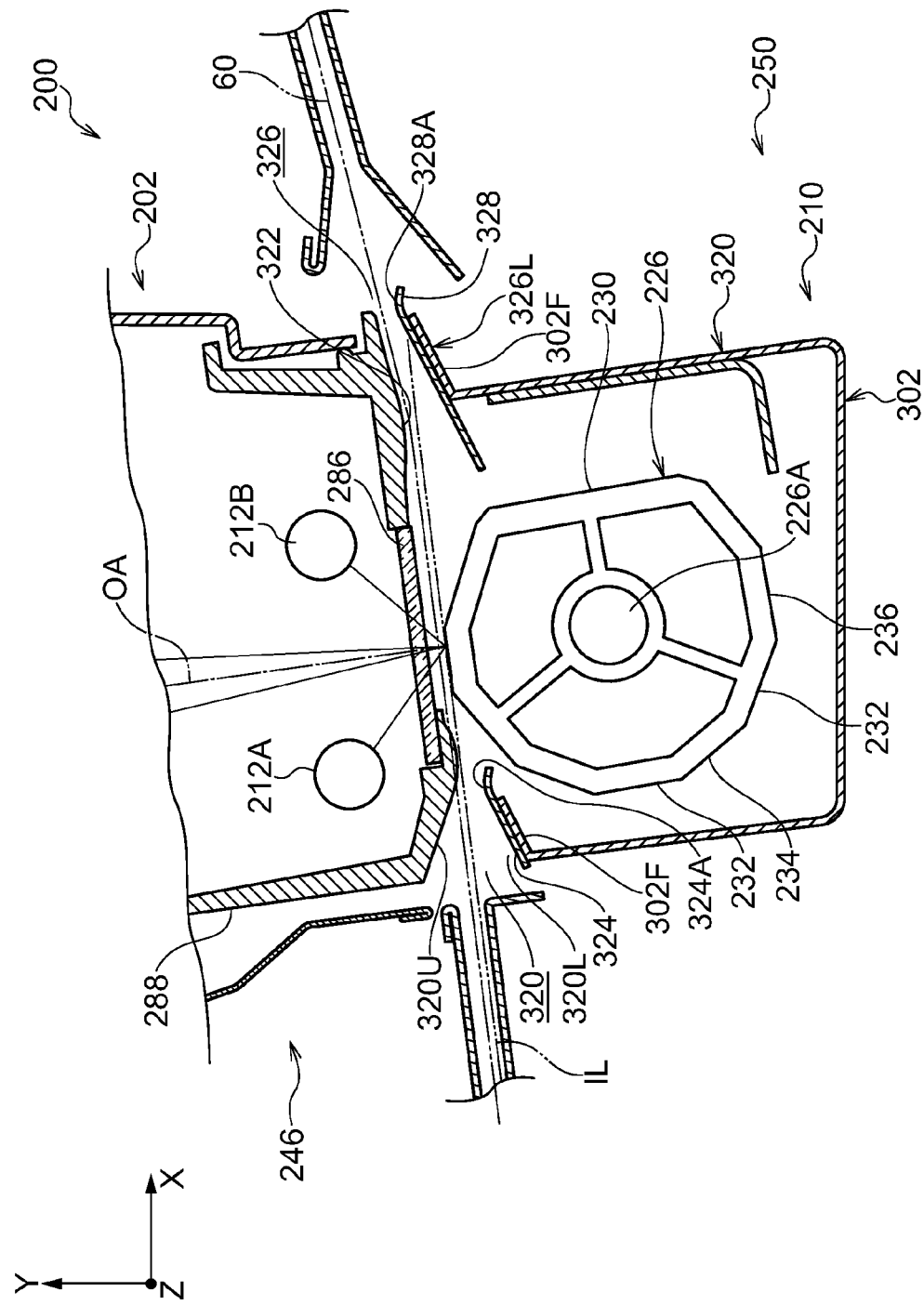
FIG. 6 is a schematic cross-sectional view showing a lower unit of the inline sensor according to the exemplary embodiment of the invention.

As shown in FIG. 6, the transportation path 60 between the center unit 246 (the emission unit 202) and the lower unit 250 (the setting unit 210) is elevated toward the downstream side in the transportation direction of the recording medium P. Then, each corner portion of a window cover 288 and the lower housing 302 is subjected to chamfering or R-chamfering. Accordingly, the inline sensor 200 is provided with an inlet chute 320 as an inducing portion directed toward the upstream side in the transportation direction of the recording medium P.

An upper chute 320U forming the upper portion of the inlet chute 320 is formed as a smooth curved surface that is downwardly convex. When an extension line of a detection reference surface 228 in the Z direction is denoted by IL while the detection reference surface 228 of the reference roll 226 is directed toward the transportation path 60 of the recording medium P, the dimension of the upper chute 320U is set so that the upper chute is interfered with by the extension line IL (so that the protrusion end of the upper chute 320U is located below the extension line IL).

Further, a convex portion 322 is formed at the downstream side of the window cover 288 in the transportation direction of the recording medium P, further downstream than the window glass 286, as a smooth curved surface that is downwardly convex. The convex portion 322 is located above the extension line IL.

The lower chute 320L constituting the lower portion of the inlet chute 320 becomes closer to the reference roll 226 by the lower chute member 324 fixed to a flange 302F extending inward from the open end of the lower housing 302. Then, the downstream end of the lower chute member 324 in the transportation direction of the recording medium P is formed as a rounded R-portion 324A that is upwardly convex.

On the other hand, an outlet chute 326 is formed between the lower housing 302 and the downstream side in the transportation direction of the recording medium P in the convex portion 322. A lower chute 326L constituting the lower portion of the outlet chute 326 is formed by fixing a lower chute member 328 to a flange 302F extending outward from the open end of the lower housing 302. Then, the downstream end of the lower chute member 328 in the transportation direction of the recording medium P is formed as a rounded R-portion 328A that is upwardly convex.

Further, the detection reference surface 228 of the reference roll 226 is directed toward the recording medium P in a posture of being substantially parallel to the window glass 286 when the image detection is performed by the CCD sensor 204. The guide surfaces 238 respectively provided at both sides of the detection reference surface 228 receive the recording medium P from the inlet chute 320, and guides the recording medium P toward the outlet chute 326.

On the other hand, the retreat surface 230 of the reference roll 226 is directed toward the recording medium P in a posture (non-parallel posture) of becoming closer to the window glass 286 approaching to the downstream side in the transportation direction of the recording medium P when the image detection is not performed by the CCD sensor 204. Further, the retreat surface 230 is formed as a wide surface that extends from the R-portion 324A of the lower chute member 324 to the vicinity of the outlet chute 326, receives the recording medium P from the inlet chute 320 in the above posture, and guides the recording medium P toward the outlet chute 326.

(Operation of Inline Sensor)

As shown in FIG. 3, the inline sensor 200 emits a beam from the pair of lamps 212 to the recording medium P passing between the emission unit 202 and the setting unit 210. The beam reflected from the recording medium P is guided to the imaging unit 208 along the optical axis OA, and forms an image at the CCD sensor 204 by the imaging optical system 206 of the imaging unit 208. The CCD sensor 204 outputs a signal according to the image density for each position of the image to the control device 192 of the image forming apparatus 10. In the control device 192, the image density, the image formation position, for example, are corrected on the basis of the signal from the CCD sensor 204.

On the other hand, when the calibration of the CCD sensor 204 constituting the inline sensor 200 is performed, the motor of the lower unit 250 is first operated so that the white reference surface 232 is directed toward the transportation path 60 of the recording medium P. The CCD sensor 204 is adjusted so that a predetermined signal is output therefrom.

Subsequently, the complex detection surface 236 is directed toward the transportation path 60 of the recording medium P, and the detection position of the CCD sensor 204 is adjusted so that the gap between the linear portion 240A and the oblique portion 240B of the position adjustment pattern 240 becomes equal to the gap between the linear portion 240C and the oblique portion 240B. Subsequently, the CCD sensor 204 checks its focus state by using the focus detection pattern 242.

Further, the emission depth is checked depending on the depth detection pattern 244. Furthermore, the color reference surface 234 is directed toward the transportation path 60 of the recording medium P. Then, the CCD sensor 204 is adjusted so that a predetermined signal for each color is output therefrom.

(Configuration and Effect of Main Part)

Figure 7:
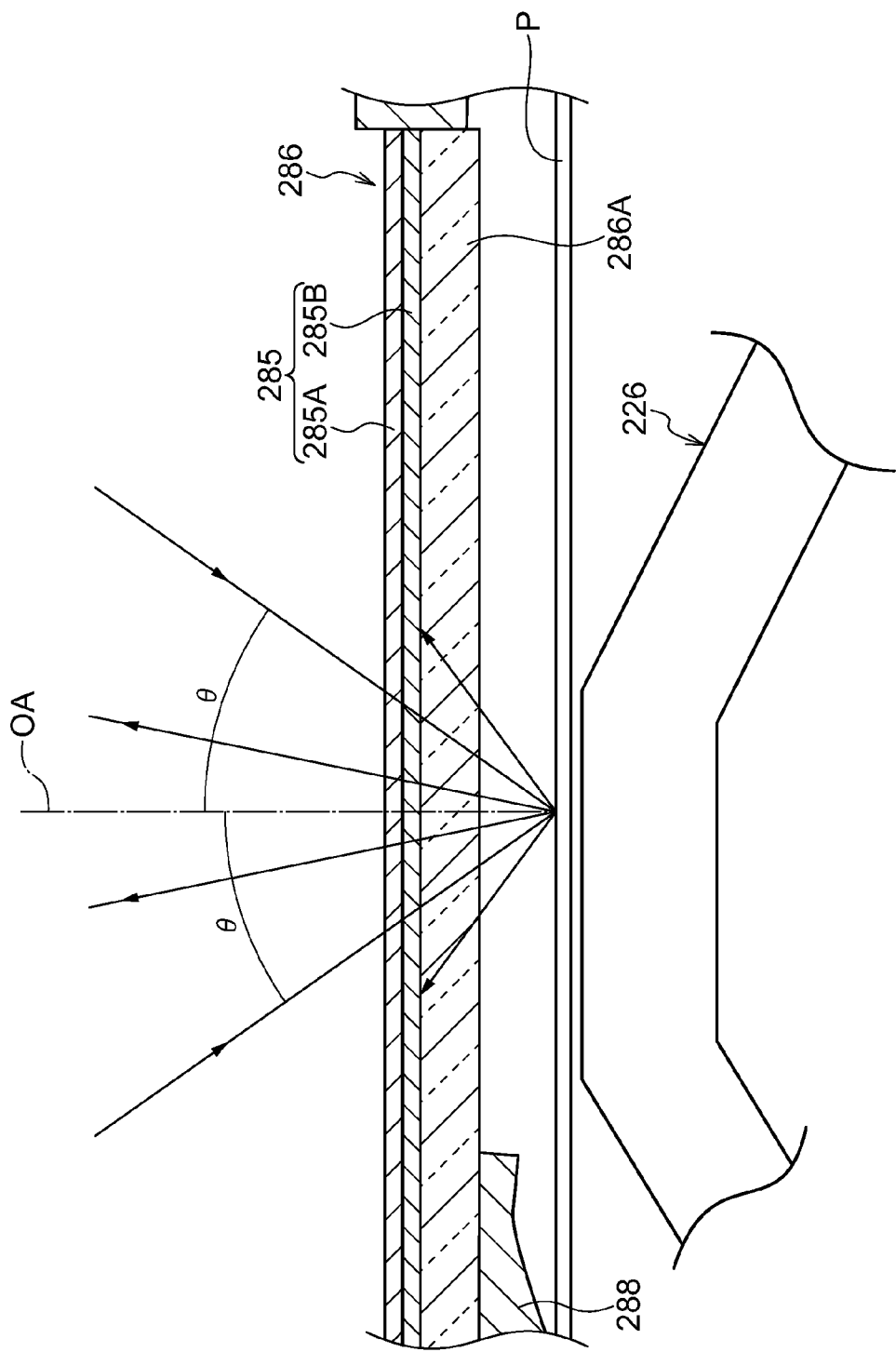
FIG. 7 is a schematic cross-sectional view showing a window glass having an antireflective film formed in a double-layered structure in the inline sensor according to the exemplary embodiment of the invention.

Next, the window glass 286 will be described in detail. As shown in FIG. 7, the window glass 286 has an antireflective film 285 formed on the upper layer (the layer opposite to the recording medium P) thereof to mainly suppress (reduce) or prevent the reflection of a regular reflection component (hereinafter, simply referred to as a "regular reflected beam") of a reflected beam reflected from the recording medium P.

That is, the window glass 286 is formed in a manner such that a conductive dielectric film 285B formed of Tin-doped Indium Oxide (ITO) and having a film thickness of 230 nm is laminated on a glass 286A as a base and a dielectric film 285A formed of magnesium fluoride ($MgF_2$) and having a film thickness of 113 nm is laminated on the conductive dielectric film 285B, and the conductive dielectric film 285B and the dielectric film 285A constitute the antireflective film 285 having a double-layered structure (a multiple-layered structure).

Here, the antireflective film 285 is provided to reduce a cavity effect. The cavity effect indicates that the regular reflected beam reflected from the recording medium P is reflected again from the window glass 286 toward the recording medium P to change the luminance thereof, which degrades the density reading precision. Accordingly, it is desirable to prevent the cavity effect and to reduce the reflectivity of the window glass 286.

However, in the design of a general antireflective film (not shown), the priority is to suppress or prevent the reflection of the beam incident in the direction perpendicular to the surface of the window glass. That is, in the general reading optical system (scanner optical system), the incident angle of a bundle of imaging beams is 0° to decrease the aberration of the bundle of imaging beams, and the antireflective film is optimized with respect to the incident angle of the bundle of imaging beams to ensure the imaging quality.

Figure 11:
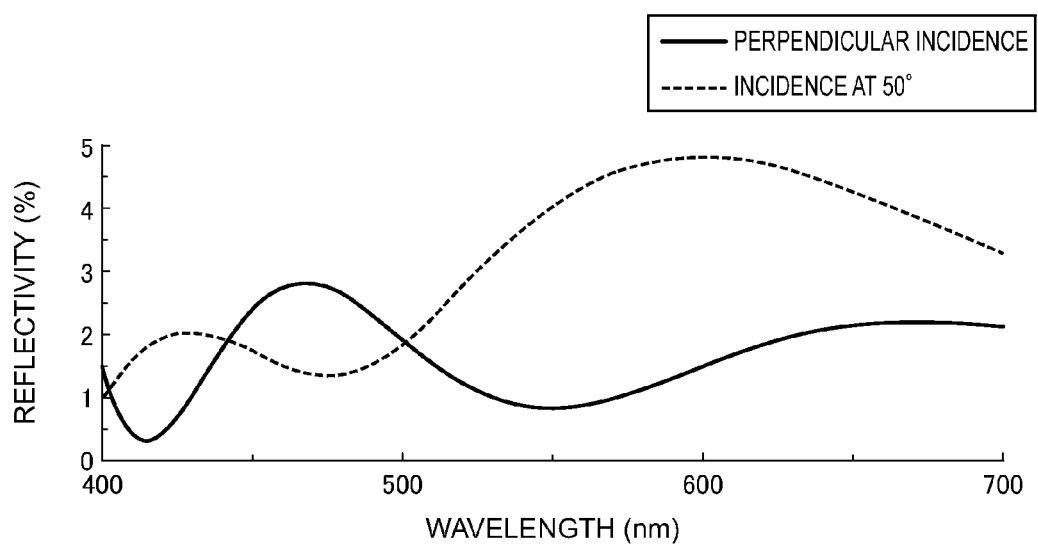
FIG. 11 is a graph showing reflectivity of a regular reflected beam of a window glass having an antireflective film formed in a double-layered structure in an inline sensor according to a comparative example.

For this reason, as shown in the comparative example of FIG. 11, in the visible light wavelength range from 400 nm to 700 nm, the maximum value of the reflectivity of the beam incident in the direction perpendicular to the window glass having an antireflective film formed in a general double-layered structure becomes smaller than the maximum value of the reflectivity of the beam incident in the direction inclined with respect to the window glass.

However, in the inline sensor 200 according to the exemplary embodiment, the beam is incident in the direction inclined by 50° with respect to the perpendicular direction of the window glass 286 (hereinafter, an "incident angle θ of 50°"). Accordingly, the sensor is designed to first suppress or prevent the reflection of the regular reflected beam (the first incident beam) of the beam incident in the incident direction (the incident angle θ of 50°).

That is, in the inline sensor 200 according to the exemplary embodiment, it is a main object to highly precisely detect the density. A spatial resolution is not needed to measure the density by using a patch having a large area and a uniform density, and the object may be attained when the beam emitted to the patch to be measured is not disturbed.

Figure 8:
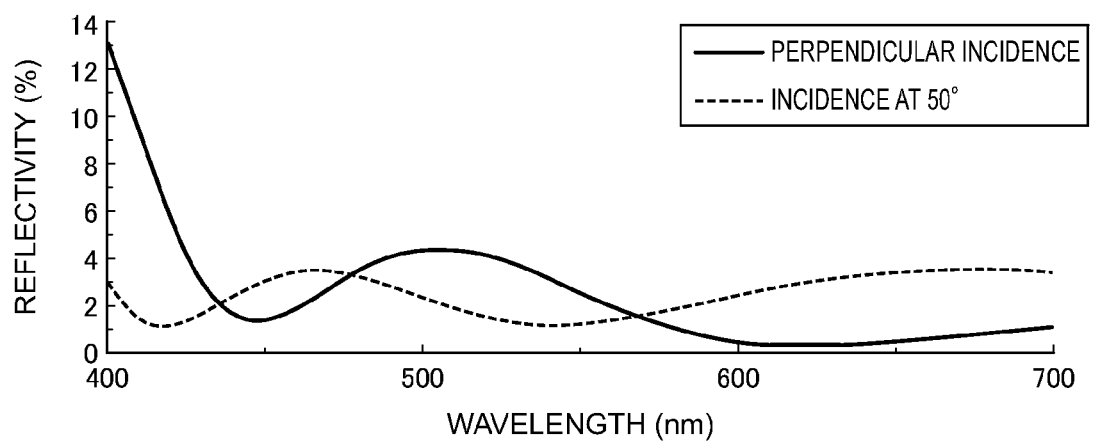
FIG. 8 is a graph showing reflectivity of a regular reflected beam of the window glass having the antireflective film formed in the double-layered structure in the inline sensor according to the exemplary embodiment of the invention.

Accordingly, the antireflective film 285 is optimized so that flare or stray light is not generated in the emitted beam. That is, as shown in FIG. 8, in the visible light wavelength range from 400 nm to 700 nm, the maximum value of the reflectivity of the beam incident in the direction perpendicular to the window glass 286 having the antireflective film 285 according to the exemplary embodiment is larger than the maximum value of the reflectivity of the beam incident in the direction inclined with respect to the window glass 286 at the incident angle θ of 50°).

In other words, the maximum value of the reflectivity of the regular reflected beam of the beam incident in the direction inclined at the incident angle θ of 50° with respect to the window glass 286 having the antireflective film 285 according to the exemplary embodiment is smaller than the maximum value of the reflectivity of the regular reflected beam of the beam incident in the direction perpendicular to the window glass 286.

In this way, the reduction of the reflectivity of the regular reflected beam of the beam incident in the perpendicular direction and the reduction of the reflectivity of the regular reflected beam incident in the inclined direction have a trade-off relationship. In the window glass 286 according to the exemplary embodiment, the cavity effect with respect to the regular reflected beam of the beam incident in the inclined direction at the incident angle θ of 50° may be reduced.

That is, the cavity effect increases as the reflectivity increases, and in the window glass 286 according to the exemplary embodiment, the cavity effect may decrease by decreasing the maximum value of the reflectivity with respect to the regular reflected beam of the beam incident in the inclined direction at the incident angle θ of 50°.

Furthermore, when there are at least two minimum values of the reflectivity of the regular reflected beam in the visible light wavelength range, the maximum value of the reflectivity of the regular reflected beam may be reduced compared to the case where there is only one minimum value of the reflectivity of the regular reflected beam.

Specifically, in the comparative example shown in FIG. 11, there are two minimum values of the reflectivity of the beam incident in the direction perpendicular to the window glass including an antireflective film having a general double-layered structure in the visible light wavelength range, and there is only one minimum value of the reflectivity of the beam incident in the direction inclined with respect to the window glass at the incident angle θ of 50°.

That is, the wavelength of the minima of the reflectivity of the incident beam with an incident angle θ of 0° are 420 nm and 550 nm, and there are two minimum values in the visible light range. However, in the incident beam with an incident angle θ of 50°, since the component in the film thickness direction of the wave number vector of the beam in the antireflective film decreases, the wavelength of the minima is shifted to the shorter wavelength side. The wavelength of 550 nm for one of the minima at the incident angle θ of 0° is shifted to the vicinity of 475 nm at the incident angle θ of 50°, and the wavelength of 420 nm for the other minimum at the incident angle θ of 0° is shifted to 400 nm or less out of the visible light range at the incident angle θ of 50°.

In this way, in the window glass according to the comparative example, the minimum value of the reflectivity of the regular reflected beam of the incident beam in the inclined direction at the incident angle θ of 50° is deviated from the visible light wavelength range due to the change in the optical path length inside the antireflective film accompanying the change in the incident angle (the minimum value is not present within the visible light wavelength range). In addition, when the antireflective film is optimized to be from 400 nm to 700 nm to prevent the reflection in the visible light wavelength range, the wavelength having the minimum value of the reflectivity includes one wavelength in the antireflective film formed in a single-layered structure, two wavelengths at maximum in the antireflective film formed in a double-layered structure, and three wavelengths at maximum in the antireflective film formed in a triple-layered structure.

On the contrary, in the exemplary embodiment shown in FIG. 8, there are two minimum values of the reflectivity of the regular reflected beam of the beam incident in the direction inclined with respect to the window glass 286 at the incident angle θ of 50° within the visible light wavelength range. When any film is an antireflective film at a wavelength of 420 nm, the film becomes a reflection increasing film at a wavelength of 840 nm which is twice the wavelength of 420 nm. For this reason, when the wavelengths having the minimum values are disposed within the visible light wavelength range from 400 nm to 700 nm with a good balance (so that at least two minimum values are provided), the reflection may be prevented in the entire desired wavelength range. That is, here, the reflectivity may be reduced in the entire visible light wavelength range.

Figure 9:
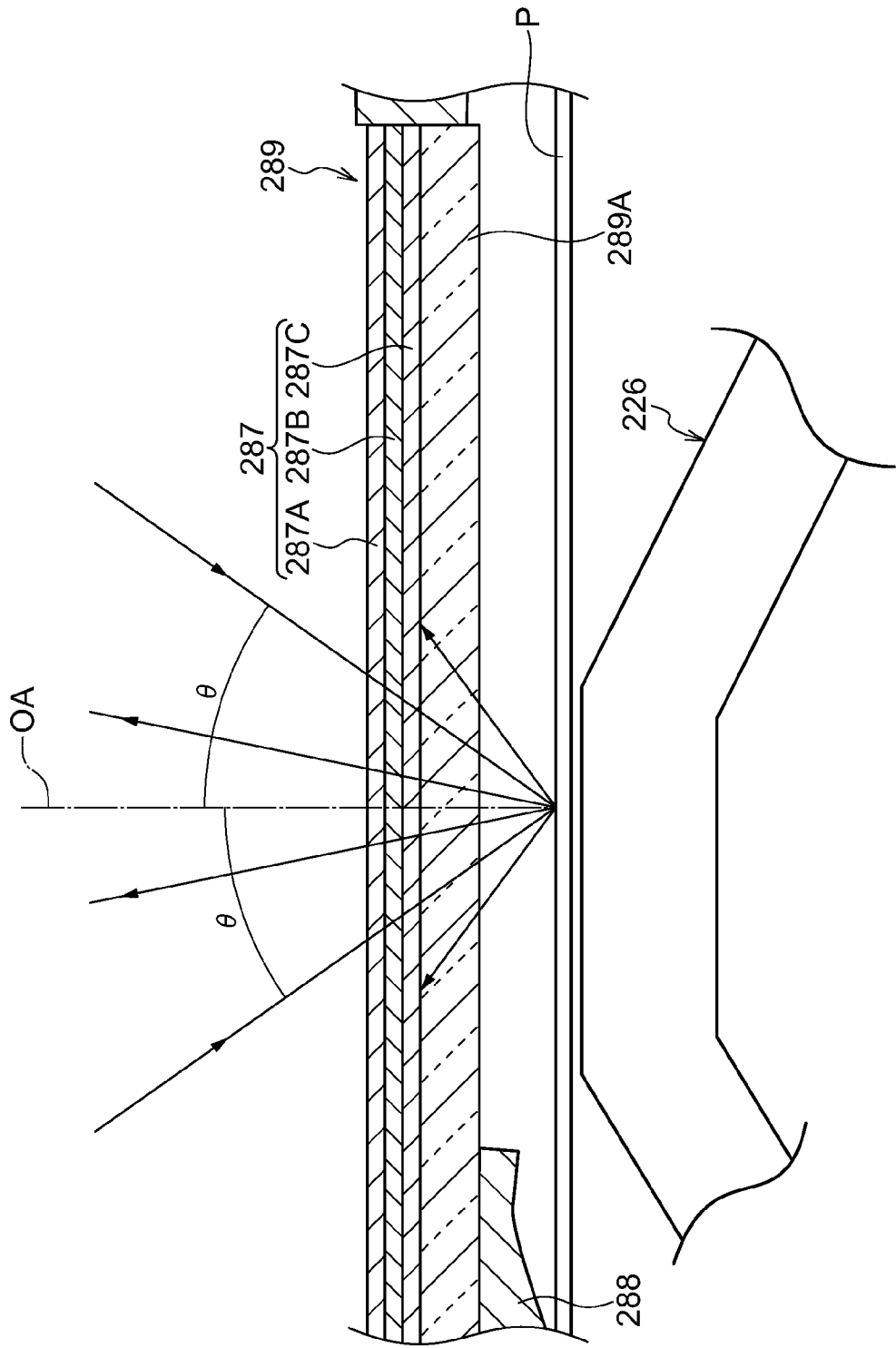
FIG. 9 is a schematic cross-sectional view showing a window glass having an antireflective film formed in a triple-layered structure in the inline sensor according to the exemplary embodiment of the invention.

Furthermore, the same applies to a window glass 289 according to another exemplary embodiment shown in FIG. 9. The window glass 289 is formed in a manner such that a dielectric film ($MgF_2$) 287C having a film thickness of 210 nm is laminated on a glass 289A as a base, a conductive dielectric film (ITO) 287B having a film thickness of 135 nm is laminated on the dielectric film 287C, and a dielectric film ($MgF_2$) 287A having a film thickness of 100 nm is laminated on the conductive dielectric film 287B, and the dielectric film 287C, the conductive dielectric film 287B, and the dielectric film 287A constitute an antireflective film 287 formed in a triple-layered structure (a multiple-layered structure).

Figure 10:
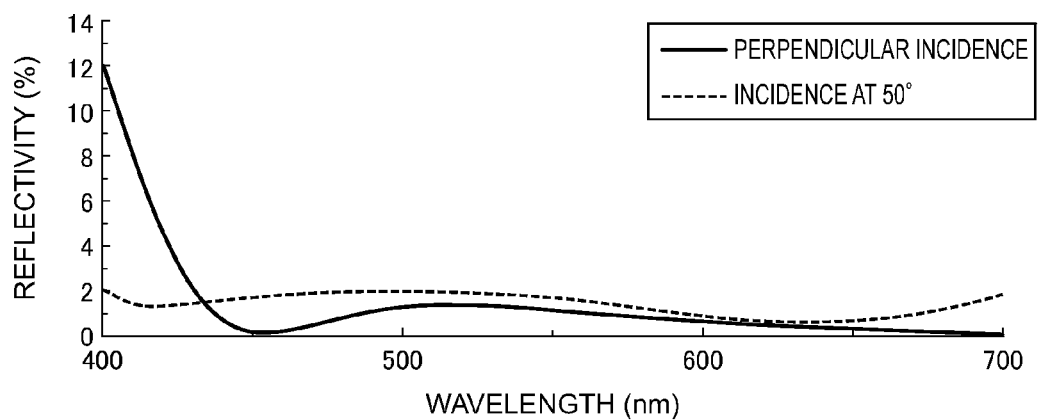
FIG. 10 is a graph showing reflectivity of a regular reflected beam of the window glass having the antireflective film formed in the triple-layered structure in the inline sensor according to the exemplary embodiment of the invention.

In the window glass 289 having the antireflective film 287 formed in the triple-layered structure, as shown in FIG. 10, the reflectivity of the regular reflected beam with respect to the incident beam in the inclined direction at the incident angle θ of 50° may be reduced more in the entire visible light wavelength range than in the window glass 286 having the antireflective film 285 formed in the double-layered structure.

While the inline sensor 200 according to the exemplary embodiments has been described by referring to the drawings, the inline sensor 200 according to the exemplary embodiments is not limited to that shown in the drawings, and it is obvious that various modifications of the exemplary embodiments may be made within the concept of the invention by the person skilled in the art. For example, the film thicknesses of the antireflective films 285 and 287 optimal for reducing the cavity effect (reducing the reflectivity of the regular reflected beam) are, of course, different from each other when the incident angles θ thereof are different from each other.

Further, the foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A detection device comprising:
   a detection member that includes an emission member emitting a beam toward a direction of a transportation path transporting a medium thereon and a beam receiving member receiving a reflected beam emitted from the emission member and reflected from the medium transported along the transportation path, and that detects at least one of an image formed on the medium transported along the transportation path, or the medium;
   a transmissive member that is provided to allow a regular reflected beam of the beam reflected from the medium to be obliquely incident thereto, and through which the beam emitted from the emission member is transmitted; and
   a multiple-layered antireflective film that is provided on the transmissive member,
   the antireflective film being formed such that a maximum value of reflectivity of a first incident beam incident at the same angle as an incident angle of the reflected beam is smaller than a maximum value of reflectivity of a second incident beam incident in the direction perpendicular to the transmissive member within a visible light wavelength range.

2. The detection device of claim 1, wherein the antireflective film is formed such that at least two minimum values of the reflectivity of the first incident beam are present in the visible light wavelength range.

3. The detection device of claim 1, wherein the antireflective film includes a conductive film laminated on the transmissive member at the opposite side of the transmissive member from the medium and a dielectric film laminated on the conductive film.

4. The detection device of claim 1, wherein the antireflective film includes a first dielectric film laminated on the transmissive member at the opposite side of the transmissive member from the medium, a conductive film laminated on the first dielectric film, and a second dielectric film laminated on the conductive dielectric film.

5. An image forming apparatus comprising:
   an image forming unit that forms an image on a medium transported by a transportation unit; and
   the detection device of claim 1 that detects the image formed on the medium by the image forming unit or the medium.

* * * * *